United States Patent [19]

Rawicz

[11] 4,320,287
[45] Mar. 16, 1982

[54] TARGET VEHICLE TRACKING APPARATUS

[75] Inventor: Harris C. Rawicz, Bridgewater, N.J.

[73] Assignee: Lockheed Electronics Co., Inc., Plainfield, N.J.

[21] Appl. No.: 115,222

[22] Filed: Jan. 25, 1980

[51] Int. Cl.$^3$ .................. G06F 15/50; G06F 15/58; G05B 13/02

[52] U.S. Cl. ................... 235/412; 364/459; 364/516; 364/724

[58] Field of Search ............. 235/404, 410, 411, 412; 343/55 T, 7.4, 16 M; 364/450, 516, 724

[56] References Cited

U.S. PATENT DOCUMENTS

| | | | |
|---|---|---|---|
| 4,004,729 | 1/1977 | Rawicz et al. | 235/404 |
| 4,128,837 | 12/1978 | Page | 235/412 X |
| 4,146,780 | 3/1979 | Sprey | 235/412 |
| 4,148,026 | 4/1979 | Gendreu | 235/411 X |
| 4,168,500 | 9/1979 | Brassaw | 343/16 M X |
| 4,179,696 | 12/1979 | Quesinberry et al. | 235/412 X |

OTHER PUBLICATIONS

McEvoy et al., Advanced Concepts in Terminal Area Control Systems,. USSR/US Aeronautical Technology Symposium, Jul. 1973.

*Primary Examiner*—Felix D. Gruber
*Attorney, Agent, or Firm*—Judlowe, Stephen B.

[57] ABSTRACT

Vehicle tracking and position predicting apparatus includes an improved Kalman velocity filter feedback loop having a forward gain matrix for loop coordinate error factors and those of their derivatives; and position predicting computing apparatus in the loop feedback path between the system output and an input error node. Sensor reference target signals (e.g., range, bearing and elevation) are connected as inputs to the filter error node.

In accordance with one aspect of the present invention, sensor coordinate reference errors from the input error node are converted to target reference coordinates. Pursuant to a further aspect of the present invention, the gain matrix is varied dependent upon sensor coordinate variables. Gain matrix variations are thus independent of geometry and sensor reference coordinates.

2 Claims, 3 Drawing Figures

TARGET VEHICLE TRACKING APPARATUS

DISCLOSURE OF INVENTION

This invention relates to vehicle tracking apparatus and, more specifically, to improved vehicle position reporting apparatus which utilizes in part a target vehicle reference system to rapidly sense target maneuvers.

Accurately predicting the position in space of a rapidly moving vehicle is a continuing subject of great interest. Vehicle position anticipating and reporting is required, for example, for air traffic control and collision avoidance; or for automated gunnery and missile weaponry. The computational speed and accuracy required for such velocity filtering apparatus has steadily increased with concomitant increases of the velocity and maneuverability of target aircraft, missiles, and the like.

It is an object of the present invention to provide improved vehicle tracking apparatus.

More specifically, it is an object of the present invention to provide improved velocity filtering apparatus which operates in part upon a target vis-a-vis sensor coordinate reference system to more quickly reflect target vehicle maneuvers.

It is another object of the present invention to provide adaptive control to change the gain matrix sensitivity of a Kalman velocity filter.

The above and other objects of the present invention are realized in specific, illustrative vehicle tracking and position predicting apparatus which includes an improved Kalman velocity filtering feedback loop having a forward gain matrix for loop coordinate error factors and those of their derivatives; and position predicting computing apparatus in the loop feedback path between the system output and an input error node. Sensor reference target position-reporting signals, typically radar return range, bearing and elevation parameters, are connected as inputs to the filter error node.

In accordance with one aspect of the present invention, sensor reference errors from the input error node are converted to a target reference coordinate system (e.g., speed, course and angle of climb/descent). Pursuant to a further aspect of the present invention, the gain matrix is varied dependent upon sensor coordinate variables.

The above and other features and advantages of the present invention will become more clear from the following detailed description of a specific, illustrative embodiment thereof, presented hereinbelow in conjunction with the accompanying drawing in which.

Figure 1:
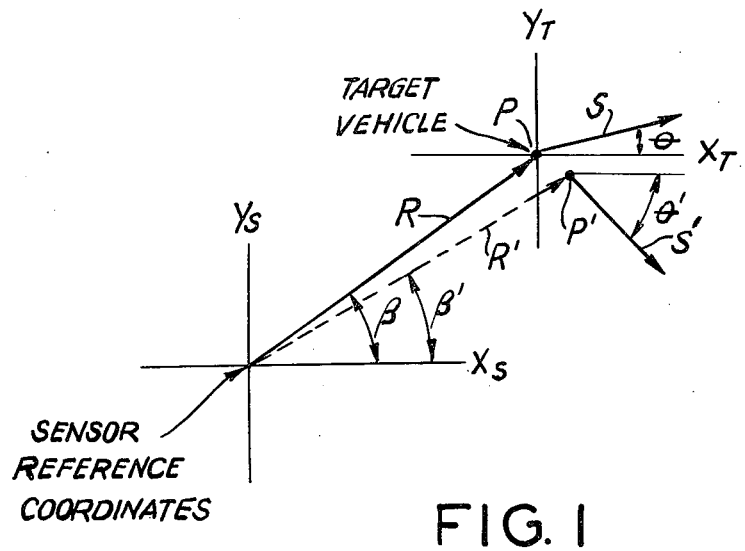
FIG. 1 is a diagram depicting sensor and target vehicle coordinates for an illustrative vehicle tracking system of the present invention.

Referring first to the coordinate definition drawing of FIG. 1, there is shown a sensor reference coordinate system employed to locate a moving target vehicle presently located at a point P. In the sensor coordinate frame of reference, the position p of the target vehicle is defined by a range from the sensor coordinate origin to the target (R); a bearing ($\beta$); and an elevation ($\epsilon$)—not shown for purposes of simplification only for the two dimensional FIG. 1 presentation, i.e., a conventional polar coordinate system.

There is also shown in FIG. 1 a target or vehicle-based coordinate system defined by the speed (S) of the target, i.e., the absolute value of the target velocity vector, the course of the vehicle ($\theta$), and the angle of climb or descent of the vehicle ($\phi$)—also not shown for simplicity in the two dimensional diagram of FIG. 1.

It is observed for purposes of the underlying principles of the present invention that any maneuver of the target vehicle is most rapidly and accurately sensed and described with respect to the target vehicle coordinate system rather than in the sensor reference coordinate system. In this regard consider, for example, a rapid turn of the aircraft which results in a change of position from the point P to the position ' of FIG. 1. The range and bearing coordinates R' and $\beta'$ in the sensor reference coordinates will change only slightly responsive to the new vehicle velocity and the resulting position p'. These small changes in range and bearing (and also in elevation where such occurs) will be small since they may represent but a small percentage of the last reported range and bearing values; and may be masked or only slowly identified over system noise or other error factors because of the small percentage changes in their respective variables. Note, however, the rapid change in the course ($\theta$) variable in the target reference system which will thus accurately reflect the newly encountered target maneuver. Some reflection will show that other maneuvers such as vehicle acceleration/deceleration (speed (S) variable) or climb/descent ($\phi$ variable) or any combination of these, will similarly be most readily observed with respect to target vehicle parameters and not sensor reference coordinates.

Accordingly, the instant invention is directed to an improved target reporting Kalman filter apparatus which utilizes in part target vehicle referenced coordinates for moving vehicle position predicting. Kalman filters are per se well known to those skilled in the art. As one illustrative publication, see "Advanced Concepts In terminal Area Control Systems (Aircraft Tracking and Collision Alert)", H. McEvoy and H. C. Rawicz, USSR/US Aeronautical Technology Symposium, July, 1973, the disclosure of which is incorporated herein by reference.

Figure 2:
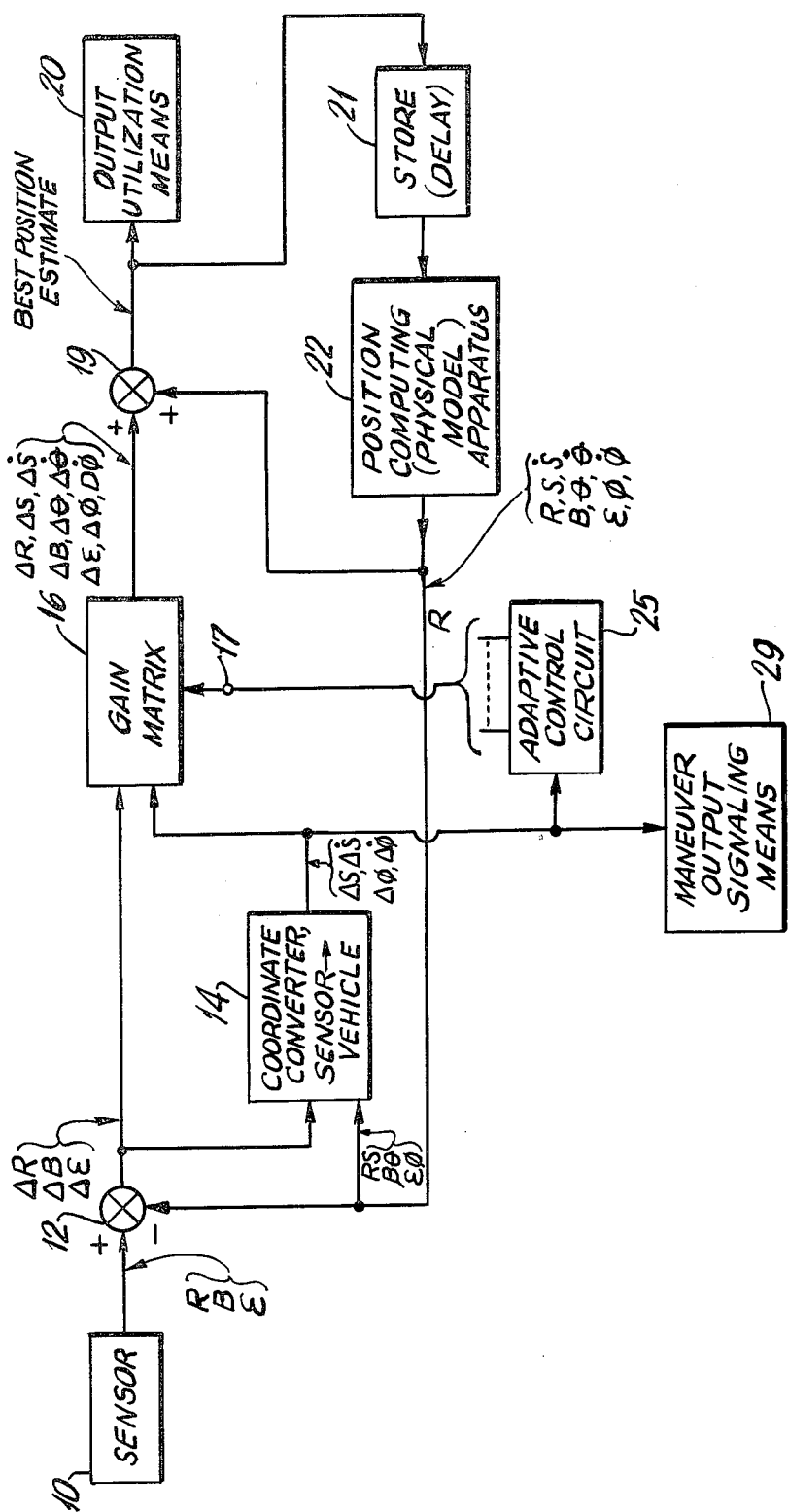
FIG. 2 is a block diagram schematically depicting improved moving vehicle tracking and position predicting apparatus in accordance with the principles of the present invention.

With the above considerations in mind with respect to the target vis-a-vis sensor coordinate system, attention is now directed to a vehicle tracking and velocity filter of FIG. 2 which comprises an improved Kalman filter feedback structure adapted to in part include vehicle reference coordinates. The arrangement includes an input difference summing node 12 which receives measured target position information in sensor coordinates from a sensor 10. Most typically, the sensor 10 may simply comprise a radar installation furnishing information as to the range (R), bearing ($\beta$) and elevation ($\epsilon$) of a particular target then under consideration. The range, bearing and elevation sensor coordinates occur on a sampled data basis, corresponding to the information gathered during the last radar interrogation cycle. The information samples occur with a time interval T between successive samples corresponding to the inverse of the radar sampling rate.

At the output of the system, i.e., at the output of a summing node 19, there is present all variables which represent the best current estimate of the position and motion of a subject target. The target is located in space in sensor or sensor-based (e.g., via any coordinate conversion) coordinates; but its motion is characterized in target coordinates. This best estimate information is applied to output utilization means 20 of any conventional type for processing and/or employing the information depending upon the environment of the composite apparatus. Thus, the best estimate target information is used to aim or guide a projectile in a weaponry context; is employed to establish present and predict future position information for an air traffic control or collison avoidance system; or the like.

The best current estimate information at the output of node 19 is stored in any kind of latch or memory 21 which effectively delays the information by one sampling period (T). This delayed best estimate information is processed by computational structure 22 which predicts the position of the target vehicle at the end of the next following sample data period, i.e., T seconds after the last position estimate appearing at the output of node 19. The physical model position computing apparatus 22 is well known to those skilled in the art and, indeed, such is used in one form or another in a host of automated fire control systems in present use; and merely implements a mathematical model for the well known mechanics of motion for the subject target vehicle. Thus, from FIG. 3, it is observed that a next target position point $P_n$ is the vector sum of the present polar coordinates $R_p$, $\beta_p$ (vector 50) and the motion during the interval T to the next sampling/predicting time (a distance S.T along course $\theta$ as shown by vector 52). This next point $P_n$ may be specified in Cartesian x-y coordinates as:

$$x = R \cos \beta + S \cdot T \cdot \cos \theta$$

$$y = R \sin \beta + S \cdot T \cdot \sin \theta$$

by the well known transformation equations. These x and y values are then converted to polar (spherical with $\rho$) form employing the usual and well known transformation equations. It is observed at this point that separate digital (or analog) computing apparatus may be employed to effect the several computational functional blocks of FIG. 2. Alternatively, the functions of each block may sequentially be effected by a single digital computer. Accordingly, the output of element 22 are the values for system position (R, $\beta$, $\epsilon$) and motion (S, $\theta$, $\phi$, $\dot{S}$, $\dot{\theta}$, $\dot{\phi}$) parameters in the sensor and target reference coordinate system predicted one data sampling period in the future vis-a-vis the last position estimate at the output of summing node 19.

At the difference or feedback loop error node 12, the actual measured sensor coordinate target information comprising range (R), bearing ($\beta$), and elevation ($\epsilon$) is compared with the corresponding predicted information therefor by the physical model apparatus 22. Accordingly, there is present at the output of summing node 12 the difference or error in range between the "actual" (i.e., radar-measured) value and that predicted therefor by structure 22 ($\Delta R$); as well as the corresponding difference or error signals for bearing ($\Delta \beta$) and elevation ($\Delta \epsilon$).

The range bearing and elevation error signals $\Delta R$, $\Delta \beta$, and $\Delta \epsilon$ are supplied to a coordinate converter 14 which converts the sensor referenced error signals ($\Delta R$, $\Delta \beta$, $\Delta \epsilon$) to those of the target reference system ($\Delta S$, $\Delta \theta$, $\Delta \phi$) as well as the rate of changes or derivatives of these quantities, $\Delta \dot{S}$, $\Delta \dot{\theta}$, and $\Delta \dot{\phi}$. The derivatives $\Delta \dot{S}$, $\Delta \dot{\theta}$ and $\Delta \dot{\phi}$ may be approximated by dividing the corresponding variables $\Delta S$, $\Delta \theta$, and $\Delta \phi$ by the elapsed time interval T.

Figure 3:
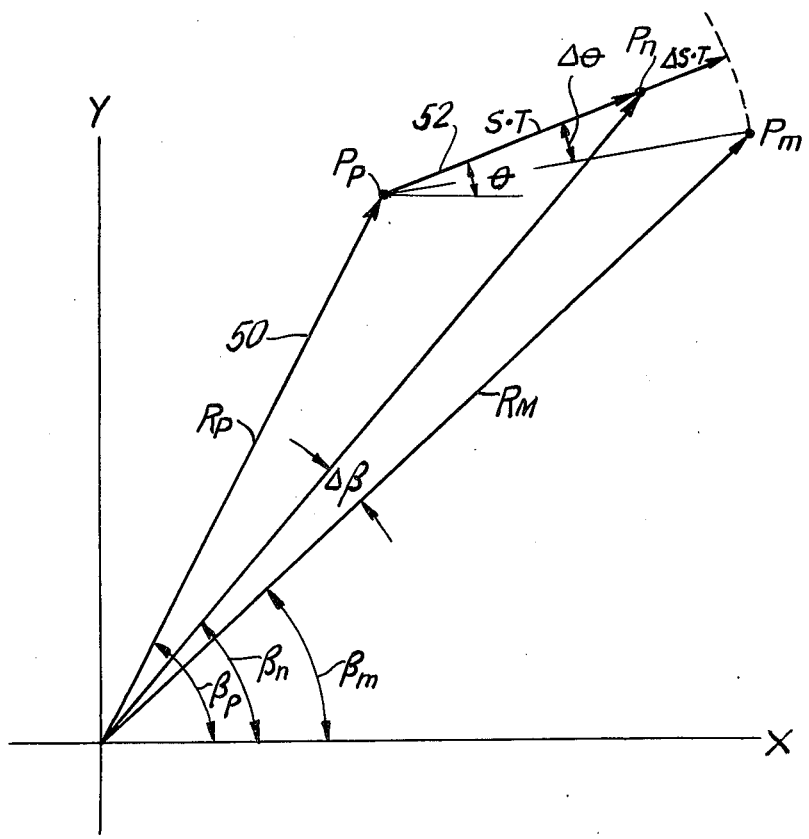
FIG. 3 is a vector diagram illustrating operation of elements 14 and 22 of FIG. 2.

FIG. 3 further shows the sensor-measured position $P_m$ of the target (sensor coordinates $R_m$, $\beta_m$) which typically differs somewhat from the predicted position $P_n$. The scale of FIG. 3 is of course greatly exaggerated for clarity; the spatial difference between $P_m$ and $P_n$ will usually be very small in comparison to the distance between $P_p$ and $P_n$. Accordingly, the converter 14 employs any well known equation set for computing the target reference coordinate based errors $\Delta S$, $\Delta \theta$ and $\Delta \phi$. Thus, for example, it will be apparent $\Delta S$, $\Delta \theta$ and $\Delta \phi$ can be obtained without approximation by resolving the coordinates of the points $P_n$ and $P_m$ to components along Cartesian x, y and z axes; and then effecting a coordinate transformation to Cartesian coordinates at the target coordinates. However, since the $P_n$–$P_m$ error distance is typically small in relation to other system scaling, small angle approximations may alternatively be used. Again, computation such as the requisite coordinate conversion may readily be effected by virtually any currently available data processing equipment and/or circuitry.

The three output sensor coordinate system error variables $\Delta R$, $\Delta \beta$, and $\Delta \epsilon$, as well as the six target referenced error variables $\Delta S$, $\Delta \theta$, $\Delta \phi$, $\Delta \dot{S}$, $\Delta \dot{\theta}$, and $\Delta \dot{\phi}$ from coordinate converter 14 are supplied to a forward gain matrix 16, and are present at the output of matrix 16 which forms one input to a summing node 19. Equations for gain matrix 16 are well known and widely employed in target position filters for weaponry. Again in the most simple form, the gain matrix may comprise a series of nine independent amplifiers (or for computer digital processing, nine multiplication factors). For the simplest form of the apparatus, the multiplication factors may be fixed values. In other forms known to those skilled in the art, the gain matrix coefficients may contain non-zero entries on other than the main diagonal such that the output variables are functions of more than one input variable. In accordance with one further aspect of the present invention, wherein an adaptive control circuit 25 is employed to change the gain matrix depending upon the data being processed, the multiplication factors ($\alpha$) may become data dependent functions. Thus, a matrix equation may be employed:

$$\begin{bmatrix} \Delta R_o \\ \Delta \beta_o \\ \Delta \epsilon_o \\ \Delta S_o \\ \Delta \theta_o \\ \Delta \phi_o \\ \Delta \dot{S}_o \\ \Delta \dot{\theta}_o \\ \Delta \dot{\phi}_o \end{bmatrix} = \begin{bmatrix} \alpha_{11}(\Delta S) & 0 & 0 & 0 & 0 & 0 & 0 & 0 & 0 \\ 0 & \alpha_{22}(\Delta \theta) & 0 & 0 & 0 & 0 & 0 & 0 & 0 \\ 0 & 0 & \alpha_{33}(\Delta \phi) & 0 & 0 & 0 & 0 & 0 & 0 \\ 0 & 0 & 0 & \alpha_{44}(\Delta S) & 0 & 0 & 0 & 0 & 0 \\ 0 & 0 & 0 & 0 & \alpha_{55}(\Delta \theta) & 0 & 0 & 0 & 0 \\ 0 & 0 & 0 & 0 & 0 & \alpha_{66}(\Delta \phi) & 0 & 0 & 0 \\ 0 & 0 & 0 & 0 & 0 & 0 & \alpha_{77}(\Delta S) & 0 & 0 \\ 0 & 0 & 0 & 0 & 0 & 0 & 0 & \alpha_{88}(\Delta \theta) & 0 \\ 0 & 0 & 0 & 0 & 0 & 0 & 0 & 0 & \alpha_{99}(\Delta \phi) \end{bmatrix} \times \begin{bmatrix} \Delta R_i \\ \Delta \beta_i \\ \Delta \epsilon_i \\ \Delta S_i \\ \Delta \theta_i \\ \Delta \phi_i \\ \Delta \dot{S}_i \\ \Delta \dot{\theta}_i \\ \Delta \dot{\phi}_i \end{bmatrix}$$

wherein the left and right column matrices are outputs and inputs for gain matrix 16; and the gain functions $\alpha_{ii}(J)$ are functions of the error obtaining in target reference coordinate speed ($\Delta S$), course ($\Delta \theta$), or climb/descent ($\Delta \phi$). That is, I have found that an efficient approximation may be effected by changing each of the range, speed and target acceleration ($\dot{S}$) gain coefficients dependent upon the speed error ($\Delta S$) value. Similarly, bearing, course, and rate of change of course gain values may be varied solely as a function of course error ($\Delta \theta$); and elevation, climb and rate of change of climb may be changed in the gain matrix solely as a function of climb/descent error ($\Delta \phi$).

The output of the gain matrix 16, then, are the nine variables shown in the left matrix above representing the processed best corrections to the predicted target information as supplied by physical model computing structure 22. That is, the outputs of the gain matrix 16 are those error quantities which tend to correct the target predicting outputs of position computing apparatus 22 to better accord with the actual measured position. As is per se well known for Kalman filters, the error or updating outputs of gain matrix 16 do not fully correct the position predicting outputs of apparatus 22 to precisely conform with the actual measurements of sensor 10 during any sampling interval since there may be noise or gross errors in any one measurement. Accordingly, such a filter must tend to correct prediction errors over a number of measurement cycles rather than making full corrections during any one measuring interval. This is effected by correcting only a part of the measurement versus prediction variation ($\alpha$-gain matrix values significantly less than unity) during each measuring cycle. By this mode of operation, the effect of bad sensor-supplied data is overcome.

At the summing node 19, the correction outputs of gain matrix 16 are simply algebraically added to the prediction output of computing apparatus 22 such that the output of summing node 19 represents the best position estimate for the target then available. It is again noted that the best position estimate output of node 19 represents information one sampling time later than that supplied by store or delay 21 to the physical computing model 22.

It is observed that the change of speed, course and climb/descent, as well as the derivatives (acceleration) of these factors are available as output signals from the coordinate converter 14. These signals best characterize any rapid change in motion of the target vehicle. It will be recalled from the discussion above with respect to FIG. 1 that such signals are much more responsive to changes in target velocity than are sensor coordinates, and thus provide a more sensitive measure and earlier report of any maneuvers of the target. The signals are supplied to matrix output signalling means 29 which may be employed to provide an output audio and/or visual alarm, computational flow interrupt, or other corrective or alarm action should any of the target referenced coordinates undergo changes more rapid than prescribed maximum bounds therefor.

As also described above, the gain matrix 16 may be fixed or, alternatively, the gain transfer multipliers may be data dependent and vary. The latter matrix set forth above presents a gain matrix where the transfer multipliers between the input and output error quantities change a function of the value of the target coordinate errors $\Delta S$, $\Delta \theta$, and $\Delta \phi$, as just one illustrative and advantageous example. The reason for changing the gain factors with target parameters is a desire to make the system more responsive (i.e., to more quickly effect corrections) when target errors are larger in magnitude, then when such errors are small. The transfer multiplier quantities between the inputs and outputs of gain matrix 16 may be mathematical equations as a function of $\Delta S$, $\Delta \theta$, and $\Delta \phi$, which render adaptive control circuit 25 simply yet another digital computing element. Alternatively, the gain matrix factors as a function of $\Delta S$, $\Delta \theta$, and $\Delta \phi$ may comprise a memory look-up table with address inputs $\Delta S$, $\Delta \theta$, and $\Delta \phi$, and multiple outputs for signalling the corresponding values dependent thereon.

Accordingly, the above-described arrangement has been shown to comprise an improved Kalman velocity filter for employing target reference coordinates as well as sensor coordinates to more quickly and accurately respond to and report the maneuvers of a monitored vehicle.

The above-described arrangement has been merely illustrative of the principles of the present invention. Numerous adaptations and modifications thereof will be readily apparent to those skilled in the art without departing from the spirit and scope of the present invention.

What is claimed is:

1. In combination in apparatus for filtering the velocity of a target vehicle, said apparatus utilizing both sensor coordinates and target reference coordinates, an output for supplying signals representing the best target estimate, difference means including first and second subtractive inputs and an output, target position predicting computing means connecting said output and said first input of said difference means, sensor means measuring present target information connected to the second input of said difference means, said difference means generating a positional error for the target in sensor coordinates, summing means responsive to outputs of said target position predicting computing means, coordinate converting means having an output, a first input connected to said target predicting computing means and a second input connected to said output of said difference means for generating at said output of said coordinate converting means error signals measured in said target reference coordinates, and gain matrix means having inputs connected to outputs of said difference means and said coordinate converting means and an output connected to said summing means.

2. A combination as in claim 1 further comprising adaptive control means responsive to target reference coordinate error signals for selectively varying the gain factors of said gain matrix means.

* * * * *